United States Patent
Shimura et al.

[11] Patent Number: 6,011,907
[45] Date of Patent: Jan. 4, 2000

[54] METHOD OF AND SYSTEM FOR PROMOTING PREDETERMINED PATTERNS AT A DESIRABLE ORIENTATION IN AN OUTPUT IMAGE

[75] Inventors: Hiroshi Shimura, Kanagawa; Kiyoshi Suzuki; Noboru Murayama, both of Tokyo, all of Japan

[73] Assignee: Ricoh Company, Ltd., Japan

[21] Appl. No.: 08/856,630

[22] Filed: May 14, 1997

[30] Foreign Application Priority Data

May 15, 1996 [JP] Japan .................................. 8-120712

[51] Int. Cl.⁷ .................. H04N 1/40; H04N 1/38; G06K 9/36; G06F 15/00
[52] U.S. Cl. .................. 395/109; 358/447; 358/458; 358/463; 382/274; 382/275
[58] Field of Search ................... 395/109; 358/445, 358/447, 448, 452, 453, 458, 463, 465, 466, 534; 382/167, 169, 172, 270, 272, 273, 274, 275

[56] References Cited

U.S. PATENT DOCUMENTS

| | | | |
|---|---|---|---|
| 5,754,311 | 5/1998 | Ray | 358/458 |
| 5,805,741 | 9/1998 | Shinohara | 382/275 |

FOREIGN PATENT DOCUMENTS

| | | |
|---|---|---|
| 62-239666 | 10/1987 | Japan . |
| 63-204375 | 8/1988 | Japan . |
| 63-288755 | 11/1988 | Japan . |

*Primary Examiner*—Edward L. Coles
*Assistant Examiner*—Mark Wallerson
*Attorney, Agent, or Firm*—Knoble & Yoshida LLC

[57] ABSTRACT

The current disclosure is directed to a method of and a system for processing input image data based upon a predetermined periodic control signal which promotes predetermined patterns at a desirable orientation and reduces undesirable texture in an output image. One example of the desirable predetermined patterns includes parallel lines in a sub-scanning direction.

44 Claims, 19 Drawing Sheets

FIG. 6

EXEMPLARY CONTROL SIGNAL GENERATION

MAIN SCANNING DIRECTION →

SUB SCANNING DIRECTION ↓

| -8 | +4 | -1 | -5 |
|----|----|----|----|
| -4 | +8 | +7 | +3 |
| +1 | +6 | +5 | -2 |
| -7 | -3 | +2 | -6 |

FIG. 12

EXEMPLARY THRESHOLD VALUE TABLE
FOR MULTIPLE NUMBER SYSTEM

| 2 | 1 | 3 | 1 | 2 | 8 | 4 | 3 |
|---|---|---|---|---|---|---|---|

EXEMPLARY THRESHOLD VALUES FOR MULTIPLE VALUE SYSTEM

| TH 1 | TH 2 | TH 3 | TH 4 | TH 5 |

TH 1 < TH 2 < TH 3 < TH 4 < TH 5

|   | Ex 1 | Ex 2 |
|---|---|---|
| A | 0<TH1 | TH1≤TH2 |
| B | TH1<TH2 | TH2≤TH3 |
| C | TH2+1<TH3 | TH3≤TH4 |
| D | TH3+1<TH4 | TH4≤TH5 |
| E | TH4+1<TH5 | TH5< |
| F | TH5+1< | |

TH1≤ ☐ <TH2

TH2≤ ▒ <TH3

TH3≤ ▒ <TH4

TH4≤ ▒ <TH5

TH5≤ ■

METHOD OF AND SYSTEM FOR PROMOTING PREDETERMINED PATTERNS AT A DESIRABLE ORIENTATION IN AN OUTPUT IMAGE

FIELD OF THE INVENTION

The current invention is generally related to a method of and a system for generating a visually palpable output image, and more particularly related to a method of and a system for processing input image data based upon a predetermined periodic control signal so as to generate gradational data which promotes predetermined patterns at a desirable orientation and reduces undesirable texture in an output image.

BACKGROUND OF THE INVENTION

Digital data is often converted into approximated gradational or gray-scale data in order to output the data through an output device such as a printer. The approximation is necessary because the output devices generally have a smaller range of output values than that of the original digital data. For example, the most printers have a predetermined number of printing elements each of which is either turned on or off to generate a dot image on an image-carrying medium. Most printers combine these elements into a unit and selectively activate a pattern of the elements in order to generate a plurality of gradational levels or multiple intensities. In other words, the increased intensity level is traded off at the cost of resolution. Despite multiple intensity levels, gradational images are often grainy.

In order to generate a visually pleasing gradational image, error diffusion techniques are used to improve the approximated intensity level. In general, error diffusion techniques distribute a difference between an approximated gradational value and an original value among the neighboring image data so as to smooth out the output image. Because of the predetermined manner of distributing the error value, the error diffusion techniques also introduce texture or visual artifacts to the output image. To avoid texture in error diffusing, during the process of approximating output values, threshold values for determining the approximated output values are varied. For example, Japanese Patent Laid Publication 62-239666 discloses a binary processing apparatus which performs error diffusion and quantization based upon a selected value from a threshold value table for reducing texture. The same reference also discloses a binary processing apparatus which performs error diffusion and adds a value stored in a table prior to quantization for reducing texture in an output image. Similarly, Japanese Patent Laid Publication 63-288755 discloses an image processing method of substantially reducing the undesirable texture in an output image. Japanese Patent Laid Publication 63-204375 also discloses a method of generating an intermediate gradational image.

The above three prior art techniques are directed to binary data and commonly employ a value table which contains periodically changing values. Although the values help generate predetermined desirable patterns in an output gradational image, undesirable texture is not sufficiently reduced by the use of the periodically changing threshold value table.

Furthermore, the gradation threshold values do not control the orientation of the desirable patterns in the output image. Even though the patterns are promoted in the output image, if the orientation of the patterns are affected by the printing process, the printed patterns are not effectively enhancing the quality of the output image. For example, the patterns are often adversely affected by jitter caused by mechanical parts for moving an image-carrying medium in a predetermined sub-scanning direction. Because of the jitter, the patterns become discontinuous or distorted, and the adversely affected patterns not only fail to enhance the visual quality of the output image, but also negatively impact the appearance of the output image.

Lastly, the above prior art techniques are not applicable to a system whose output elements are capable of generating three or more output intensity levels. In other words, output elements of certain output devices generate intermediate intensity levels other than on or off. In the multiple valued output system, a number of threshold values for each output element also correspondingly increases.

SUMMARY OF THE INVENTION

To solve above and other problems, according to one aspect of the current invention, a method of generating gradational image output data from image input data, includes the steps of: a) generating a control signal for promoting a predetermined pattern and reducing texture in the gradational image output data, the control signal having a predetermined number of control values, a sum of the control values being zero; b) adding the control signal to the image input data for generating intermediate image data; and c) comparing the intermediate image data to at least one predetermined threshold value for generating the gradational image output data.

According to a second aspect of the current invention, a method of generating gradational image output data from image input data, includes the steps of: a) generating a control signal for promoting a predetermined pattern and reducing texture in the gradational image output data, the control signal having a predetermined number of control values, a sum of the control values being zero; b) modifying a first portion of the image input data based upon the control signal for generating first intermediate image data; c) quantizing the first intermediate image data based upon at least one predetermined threshold value for generating first quantized image output data; d) modifying a second portion of the image input data based upon the control signal for generating second intermediate image data; e) error diffusing a difference between the first intermediate image data and the first quantized image data in the second intermediate image data which has been modified in the step d); and f) quantizing the second intermediate image data based upon at least the one predetermined threshold value for generating the gradational image output data.

According to a third aspect of the current invention, a system of generating gradational image output data from image input data, includes: a control signal generation unit for generating a control signal which promotes a predetermined pattern and reduces texture in the gradational image output data, the control signal having a predetermined number of control values, a sum of the control values being zero; an adder connected to the control signal generation unit for adding the control signal to the image input data so as to generate intermediate image data; and a comparator connected to the adder for comparing the intermediate image data to at least one predetermined threshold value so as to generate the gradational image output data.

According to a fourth aspect of the current invention, a system of generating gradational image output data from image input data, including: a control signal generation unit for generating a control signal which promotes a predetermined pattern and reduces texture in the gradational image output data, the control signal having a predetermined number of control values, a sum of the control values being zero; an error diffusion unit for determining an amount of error to be diffused and for generating an error signal based upon the error; an adder connected to the control signal generation unit and the error diffusion unit for adding the control signal and the error signal to the image input data so as to generate intermediate image data; and a comparator connected to the adder for comparing the intermediate image data to at least one predetermined threshold value so as to generate the gradational image output data.

These and various other advantages and features of novelty which characterize the invention are pointed out with particularity in the claims annexed hereto and forming a part hereof. However, for a better understanding of the invention, its advantages, and the objects obtained by its use, reference should be made to the drawings which form a further part hereof, and to the accompanying descriptive matter, in which there is illustrated and described a preferred embodiment of the invention.

BRIEF DESCRIPTION OF THE DRAWINGS

FIG. 4 is a diagram illustrating an exemplary output image containing a predetermined pattern of parallel lines.

FIG. 6 is another exemplary control signal for promoting a predetermined pattern in an image output according to the current invention.

FIG. 12 is another exemplary threshold table for multi-valued quantization.

DETAILED DESCRIPTION OF THE PREFERRED EMBODIMENT(S)

Figure 1:
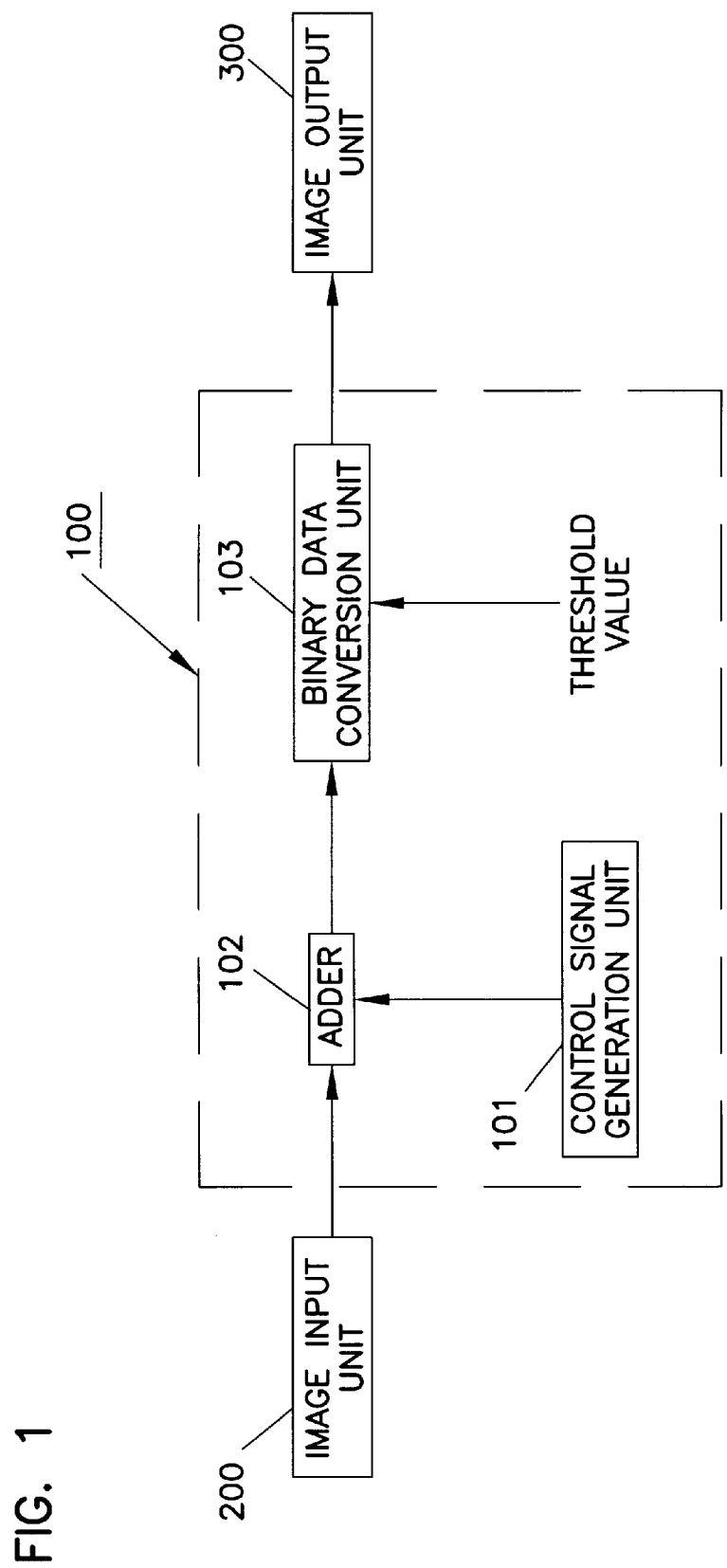
FIG. 1 is a block diagram illustrating a first preferred embodiment of the system for promoting predetermined patterns at a desirable orientation in a binary output image according to the current invention.

Referring now to the drawings, wherein like reference numerals designate corresponding structure throughout the views, and referring in particular to FIG. 1, one preferred embodiment of the system for promoting predetermined patterns at a desirable orientation in a binary output image according to the current invention is illustrated in a block diagram. An image input unit 200 including devices such as a scanner and a analog-to-digital convertor inputs digital image data into a processing unit 100 so that the digital image data is processed to binary image output data which contains some predetermined patterns. The predetermined patterns are not intended to affect the original image but are designed to improve certain visual quality or aesthetics of the output image. An image output unit 300 such as a printer and a display monitor outputs an image based upon the gradational image output data.

Still referring to FIG. 1, the processing unit 100 further includes an adder 102, a binary data conversion unit or a quantization unit 103, a control signal generation unit 101 and a predetermined threshold value. The control signal generation unit 101 generates a control signal which is designed to promote predetermined desirable patterns and to reduce undesirable texture in the output image. The control signal contains a predetermined number of control values arranged in a two-dimensional array or table. The control values are varied, and each control value is to affect a corresponding one of the input values. The control values are either positive or negative numbers within a predetermined range and the sum of the control values is zero. In general, since a number of the control values is smaller than that of the input values, the control signal is repeatedly applied to portions of the input image. In order to generate the predetermined patterns in the binary image output data, the adder 102 adds each of the control values to a corresponding one of the input values. The addition of the control values modifies the input image data in such a way to simulate a certain predetermined pattern, and the orientation of the pattern with respect to the entire output image is also determined by the control values. After the addition, the modified input data or intermediate data is now quantized or binary. In order to determine whether a particular input value is one of the two output values, the binary data conversion unit 103 compares the input value to a predetermined single threshold value. For example, if the input value is above the threshold value, the input value is converted into one. On the other hand, if the input value is equal to or less than the threshold value, the input value is converted to zero. The converted binary image output data is outputted to the image output unit 300 such as a printer and a display monitor.

Figure 2:
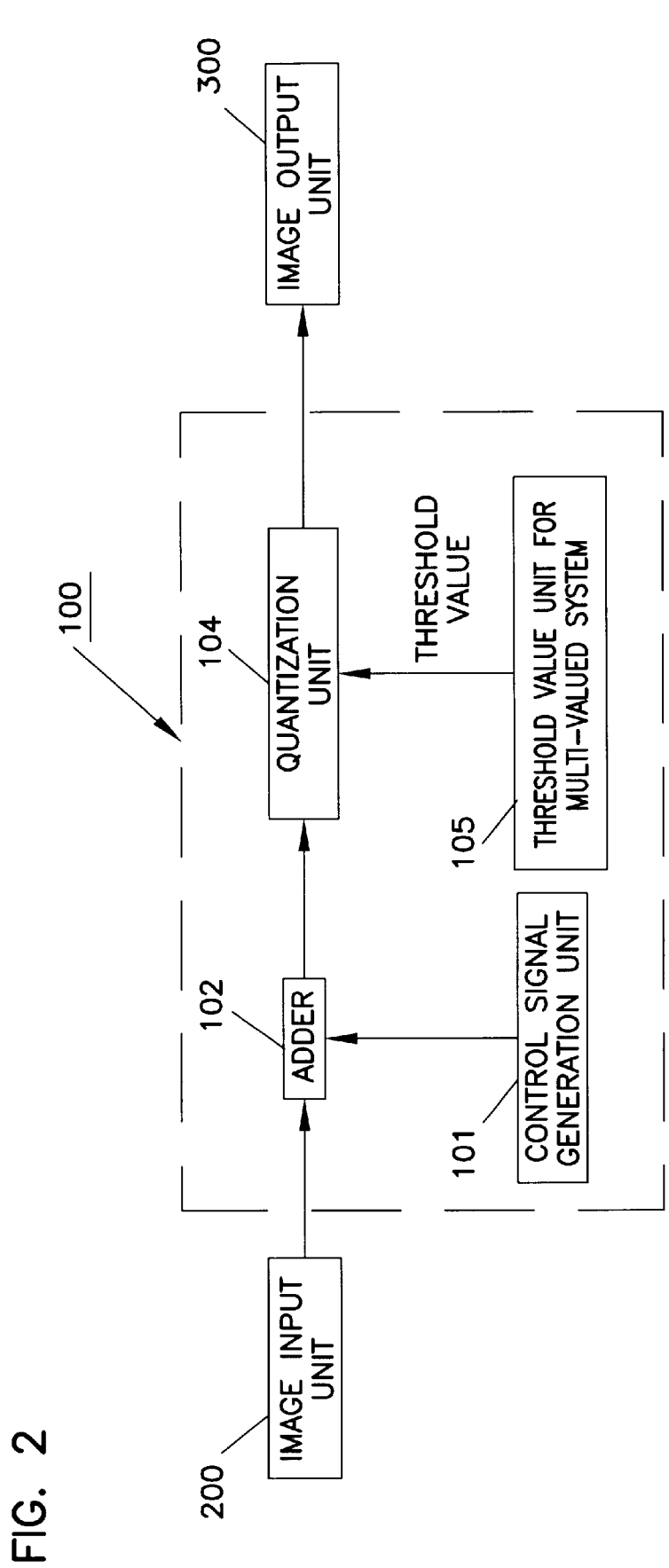
FIG. 2 is a block diagram illustrating a second preferred embodiment of the system for promoting predetermined patterns at a desirable orientation in a multi-valued gradational output image according to the current invention.

Now referring to FIG. 2, a second preferred embodiment of the system for promoting predetermined patterns at a desirable orientation in a multi-valued gray-scale image according to the current invention is illustrated in a block diagram. In general, the second preferred embodiment is substantially similar to the above described first preferred embodiment, and the corresponding units are referred by the same referenced numerals. The descriptions of these units are not reiterated herein but incorporated from the above. On the other hand, the second preferred embodiment processes the image input data in order to generate multi-valued image output data. Unlike the binary image output data, the multi-valued image output data has more than two predetermined output values. In order to generate the multi-valued image output data, the second preferred embodiment includes a quantization unit 104 and a multi-valued threshold unit 105.

The quantization unit 104 selectively determines a output value based upon a input image value and a set of threshold values. Unlike the above described binary system, a multi-valued threshold unit 105 stores a predetermined number of multiple threshold values, and the quantization unit 104 compares the input value to each of these threshold values. For example, if the image output data has five predetermined values, the multi-valued threshold unit 105 stores four threshold values, and each of the corresponding five ranges is assigned an output value. After the quantization unit 104 compares an input value to the threshold values and determines that the input value belongs to one of the five ranges, the quantization unit 101 outputs the corresponding one of the assigned output values. In general, the above described threshold value unit 105 stores only a single set of the threshold values which are location independent.

Figure 3:
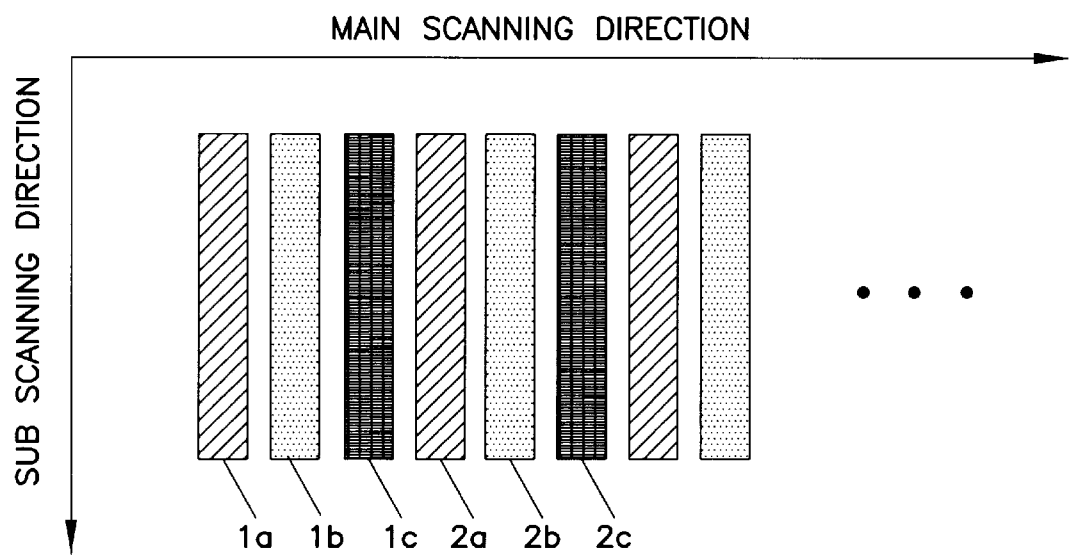
FIG. 3 is an exemplary control signal for promoting a predetermined pattern according to the current invention.

Now referring to FIG. 3, one example of the control signal is illustrated. This exemplary control signal contains three control values, 8, 0 and −8. The sum of these control values is zero, and the control values include both a positive as well as negative values. The zero summation substantially minimizes undesirable visual effects due to the addition on an output image. The negative numbers also minimize undesirable visual effects by reducing the amount of values to be added in the neighboring input values. In other words, the contrast between adjacently located output image elements is advantageously available without affecting other parts of the output image. Since these control values are respectively and separately added to three input values indicative of three adjacent input image pixels. Since the addition is repeated for every three input values, as a result the above control values are periodically affecting the input values.

FIG. 4 illustrates an effect of the above exemplary control signal values. Assuming that the above 9, 0 and −8 control values are repeated applied to input values in a main scanning direction, and further assuming that at least two threshold values are used to determine image output data, sets of parallel lines such as 1a, 1b and 1c as well as 2a, 2b and 2c are generated in an output image. In general, the main scanning direction is a direction of scanning an image during an image generation process while a sub-scanning direction is another direction perpendicular to the main scanning direction. The sub-scanning direction is also a direction of the movement of an image-carrying medium during the image generation process.

Figure 5A:
FIGS. 5A and 5B are output images produced by the system for promoting a predetermined pattern of parallel lines according to the current invention.
Figure 5B:
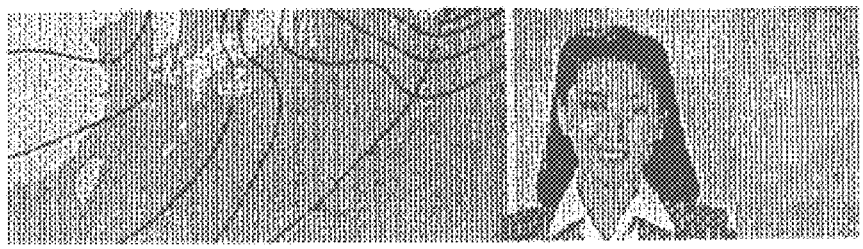
Figure 5C:
FIGS. 5C and 5D are output images produced by the conventional system which do not promote a predetermined pattern of parallel lines.
Figure 5D:
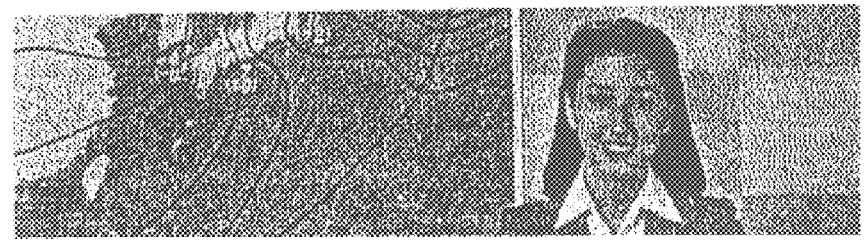

Now referring to FIGS. 5A and 5B, as a result of the repetitive or periodic addition of control values to the input values in the scanning direction and the quantization based upon a predetermined number of threshold values, the parallel line patterns are promoted in the sub-scanning direction in a gray-scale output image. FIGS. 5A and 5B are identical but only different in size, and these images show prominent but ordered vertical parallel line patterns in the background without affecting a foreground image. In contrast to these output images, FIGS. 5C and 5D show corresponding output images based upon the identical input image data without the above described process for promoting the parallel lines. While the images in FIGS. 5C and 5D both show disorganized orientation of the lines in the background, the small output image 5C particularly disturbs visual aesthetics in the background. Thus, the parallel lines not only add some visual stability in the gradational output image but also minimize undesirable or unaesthetic texture. In addition, the above described oriented parallel lines are advantageously resistant to jitters caused by mechanical parts while advancing an image-carrying medium.

Referring to FIG. 6, another exemplary control signal is illustrated in a table. As described before with respect to the first exemplary control signal in FIG. 3, the sum of these control values is zero, and the control values include both a positive as well as negative values. The control values are arranged in a four-by-four array. Among the 16 control values, four positive numbers are arranged to occupy a central portion of the table. While one of four control values located along each edge is positive, the rest of the control values along the edges is negative in the control value table. These control positive as well as negative values and their relative location in the control value table determine a predetermined pattern and its orientation in an output image. Assuming the input image data contains more than sixteen input values, a set of these sixteen control values is repeatedly applied to a block of sixteen input values in a major scanning direction as well as a sub-scanning direction to generate intermediate image data.

Figures 7, 8:
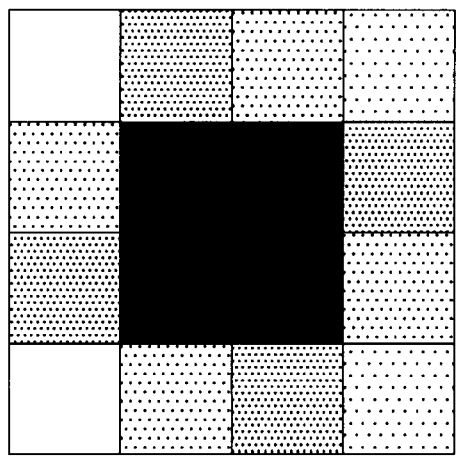
FIG. 7 are diagrams illustrating a relationship among threshold values as well as relationships between two sets of threshold ranges and quantized values.
FIG. 8 is an exemplary predetermined pattern promoted by a control signal such as one shown in FIG. 6.

To further describe the effect of the above described exemplary control value table, the intermediate image data is now quantized according to one exemplary set of threshold values as illustrated in FIG. 7. The exemplary threshold value table holds five predetermined threshold values as indicated respectively indicated by TH1 through TH5, and these threshold values are in an ascending order in their values. TH1 has the smallest value while TH5 has the largest. Each value of the intermediate image data is now compared against every one of the five threshold values. Five ranges are determined based upon these five threshold values, and each range is assigned a predetermined quantized value. In Example 1, six ranges A through F are defined based upon the five threshold values TH1 through TH5. In Example 2, five ranges A through E are defined based upon the five threshold values TH1 through TH5. Each of these defined ranges is assigned a quantized value. Thus, when the intermediate data is quantized based upon the five predetermined threshold values, the original input values are in essence converted into the five or six predetermined quantized values. The threshold values are generally determined based upon the input value range, the control values and some experimentations. The assigned multi-output values or quantized values are also generally determined based upon an output range of an output unit.

Now referring to FIG. 8, still illustrating an effect of the same exemplary control values, the quantized data are illustrated as a portion of an output image as indicated by five shades of blocks. As shown in the legend, a blank block indicates that a corresponding intermediate value falls between the first and second predetermined threshold values, and a black block indicates that a corresponding intermediate value is equal to or above the fifth threshold value. As a result, a pattern seen in the quantized multi-value output resembles that of positive-negative control values. That is, the positive control values tend to generate higher quantized values while the negative control values tend to yield lower quantized values. Predetermined patterns such one as illustrated in FIG. 8 not only add some visual stability in a gradational output image but also minimize undesirable or unaesthetic texture.

Figure 9:
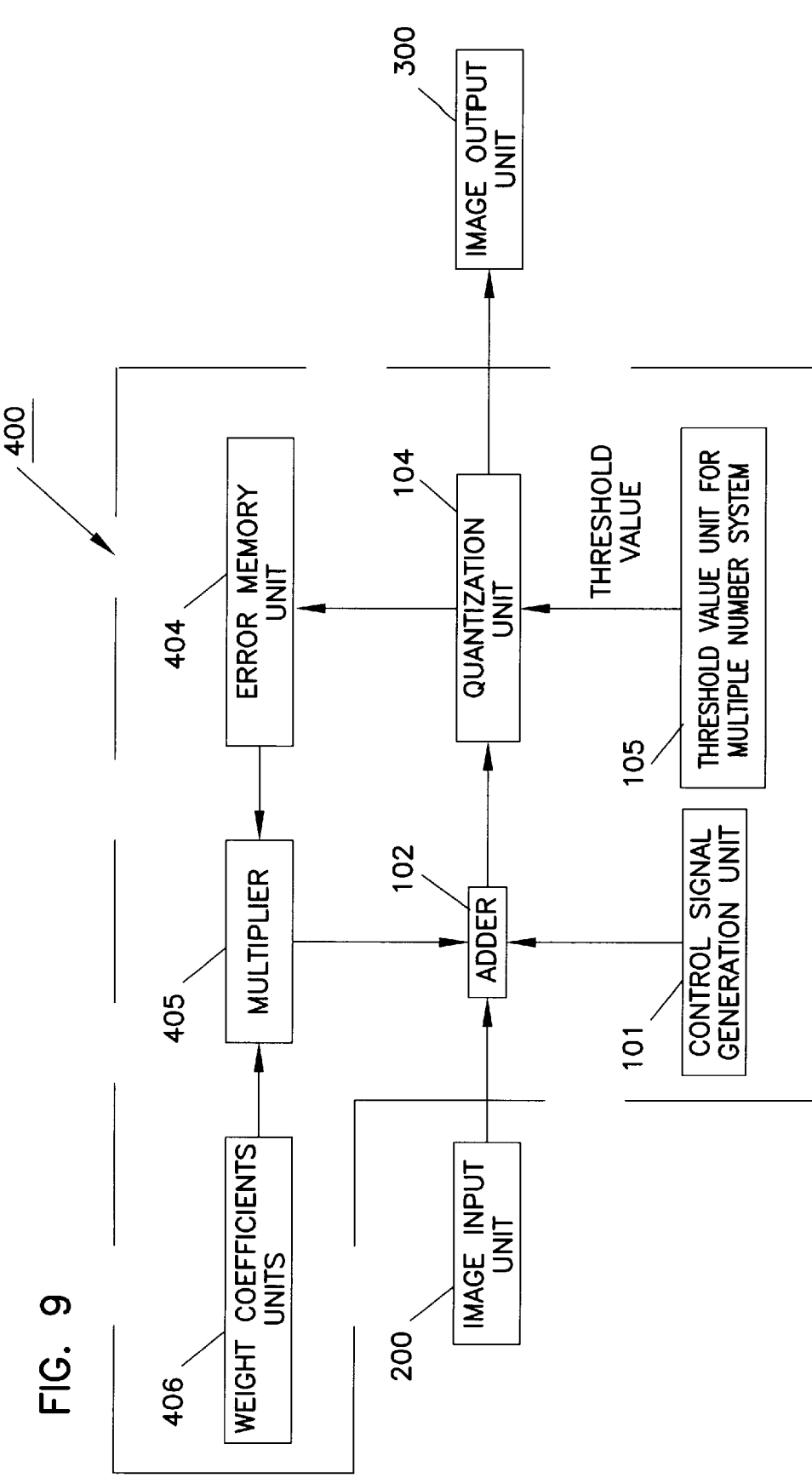
FIG. 9 is a block diagram illustrating a third preferred embodiment of the system for promoting predetermined patterns at a desirable orientation and error diffusing quantized errors in a multi-valued gradational output image according to the current invention.

Now referring to FIG. 9, a third preferred embodiment of the system for promoting predetermined patterns at a desirable orientation in a multi-valued gray-scale image according to the current invention is illustrated in a block diagram. In general, the third preferred embodiment is substantially similar to the above described second preferred embodiment, and the corresponding units are referred by the same referenced numerals. The descriptions of these units are not reiterated herein but incorporated from the above.

Still referring to FIG. 9, the third preferred embodiment additionally includes error diffusion related components in a processing unit 400. In order to perform an error diffusion process, the processing unit 400 further includes an error memory unit 404, a multiplier 405 and a weight coefficient unit 406. After each quantization, a difference between a quantized value and its corresponding intermediate value is stored in the error memory unit 404. The multiplier 405 determines a sum of products between the error values stored in the error memory unit 404 and corresponding weight coefficients stored in the weight coefficient unit 406. The weight coefficients generally determine the amount of error distribution to neighboring image data. Prior to a next round of the quantization process, an adder 102 adds a control value as well as the above determined sum of the products to an input value to generate an intermediate value. A quantization unit quantizes the intermediate value based upon a predetermined set of threshold values.

Figure 10:
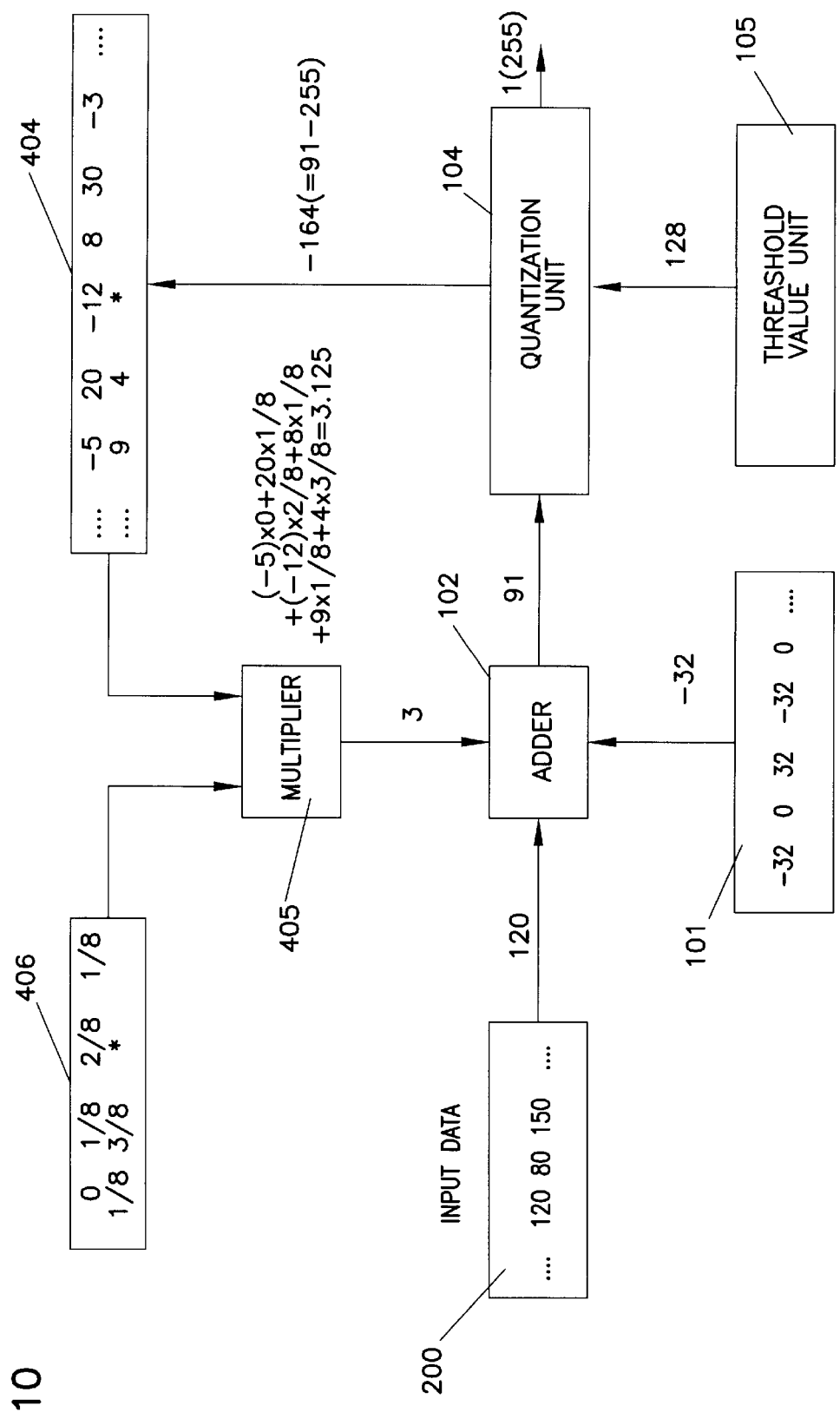
FIGS. 10 and 11 are block diagrams for illustrating a step-by-step operations for error diffusing an error as well as promoting a predetermined pattern in an output image according to the current invention.

To further illustrate the above described third preferred embodiment, referring to FIG. 10, exemplary values are used. An input data unit 200 inputs an input value "120" to an adder 102 for the preparation of the quantization process, and at the same time, a control signal generation unit 101 inputs a corresponding control value "−32" to the adder 102. A multiplier 405 determines an error correction value "3.125" based upon error values stored in an error memory unit 404 as well as weight coefficient values stored in a weight coefficient unit 406. The multiplier 405 determines a sum of the products of the error values and the weight coefficients as indicated in FIG. 10. Thus, the result of the sum of 120+(−32)+3 is 91, which is now an intermediate value for the input "120." The error correction value "3.125" is approximated. The quantization unit 104 is a binary conversion unit, and its threshold value is less than 91. Furthermore, the quantized value for a range above the threshold value is "255." Thus, the input value "122" is converted into a quantized value "255." Prior to a next round of the quantization process, a new error value or a difference between a quantized value, "255" and an intermediate value, "91" is determined to be "−164." The new error value is now stored in the error memory 404.

Figure 11:
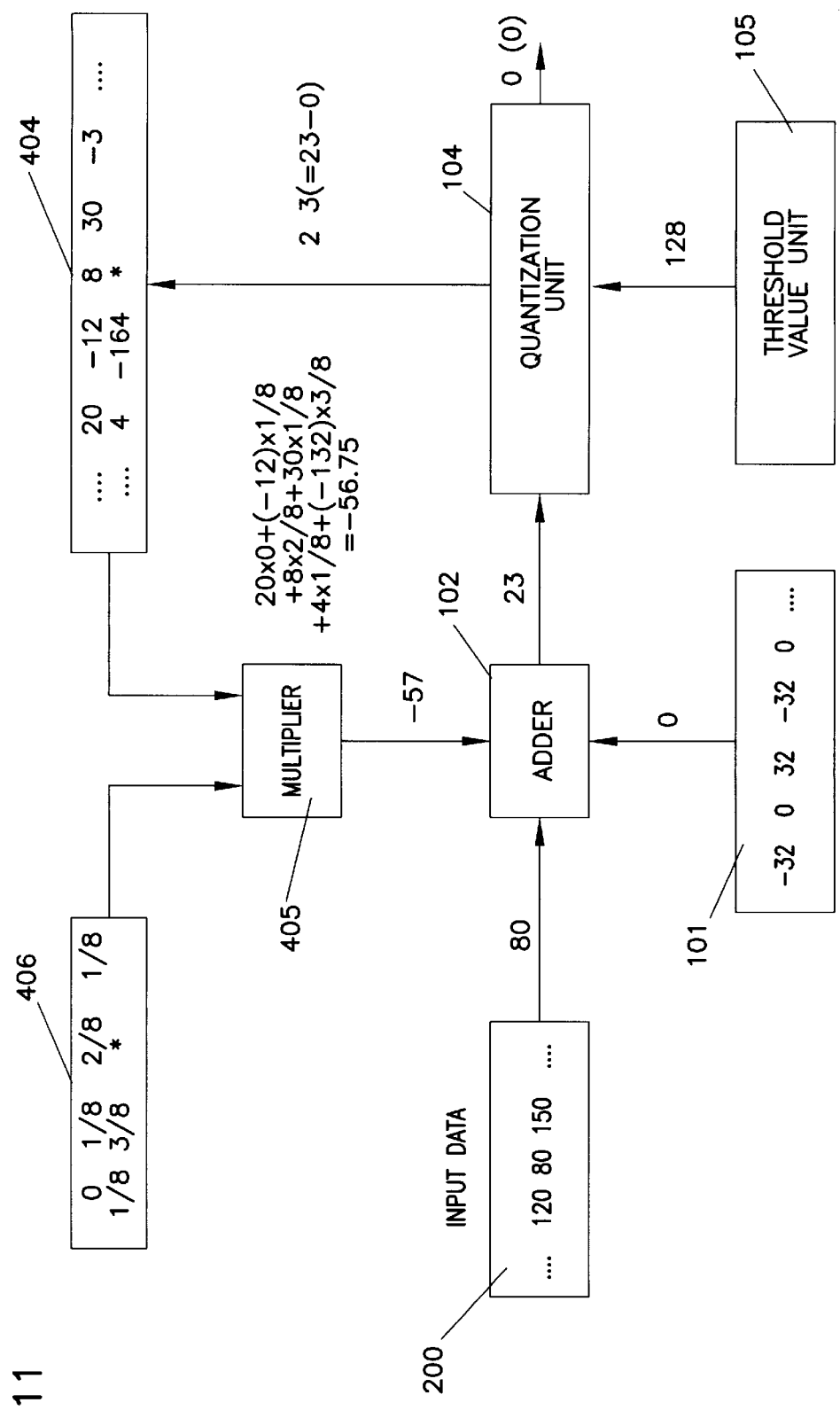

Still using the same example values, now referring to FIG. 11, a next input value "80" is processed. An input data unit 200 inputs the input value "80" to an adder 102 for the preparation of the quantization process, and at the same time, a control signal generation unit 101 inputs a corresponding control value "0" to the adder 102. A multiplier 405 determines an error correction value "−56.75" based upon error values stored in an error memory unit 404 as well as weight coefficient values stored in a weight coefficient unit 406. The multiplier 405 determines a sum of the products of the error values and the weight coefficients as indicated in FIG. 11. Thus, the result of the sum of 80+0+ (−57) is 23, which is now an intermediate value for the input "80." The error correction value "−56.75" is approximated. The quantization unit 104 is a binary conversion unit, and its threshold value is above "23." Furthermore, the quantized value for a range below the threshold value is "0." Thus, the input value "80" is converted into a quantized value "0." Prior to a next round of the quantization process, a new error value or a difference between a quantized value, "0" and an intermediate value, "23" is determined to be "23." The new error value is now stored in the error memory 404.

As a result of the operations described in FIGS. 10 and 11, the parallel-line promoting control values and the error diffusion substantially improve the quality of an output image. Although FIGS. 10 and 11 illustrate a binary quantization process, the above described third preferred embodiment is not limited to binarization and includes a multi-valued quantization. For a multi-valued quantization process for generating three or four quantized values using input values ranging from 0 to 255, a threshold value table for example contains three threshold values such as "43," "128" and "213", as shown in FIG. 12.

Figure 13:
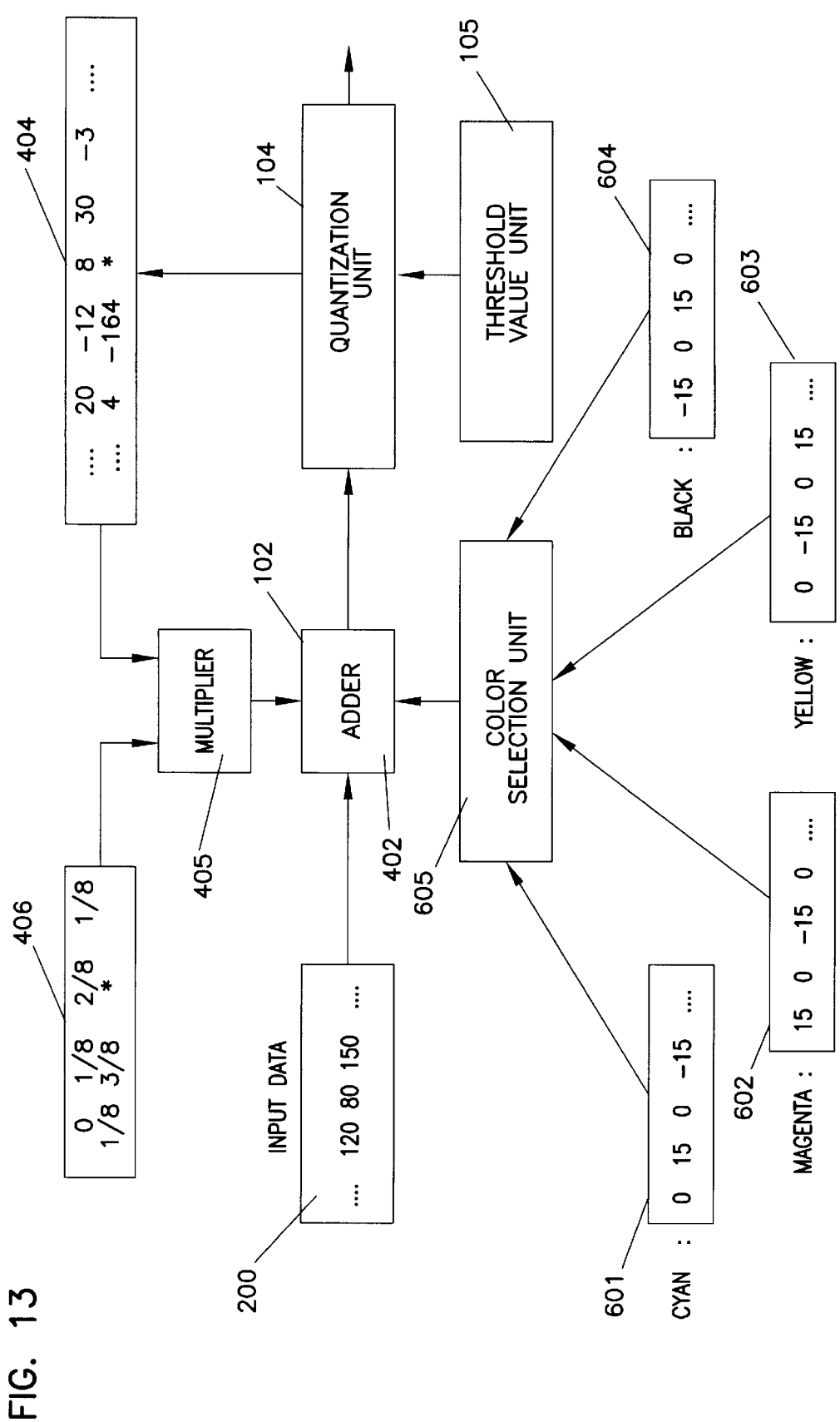
FIG. 13 is a block diagram illustrating a fourth preferred embodiment of the system for promoting predetermined patterns at a desirable orientation and error diffusing quantized errors in a color output image according to the current invention.

Now referring to FIG. 13, a fourth preferred embodiment of the system for promoting predetermined patterns at a desirable orientation in a multi-valued gradational output image according to the current invention is illustrated in a block diagram. In general, the fourth preferred embodiment includes substantially similar components or units of the above described preferred embodiments, and these units are referred by the same referenced numerals. The descriptions of these units are not reiterated herein but incorporated from the above.

Still referring to FIG. 13, the fourth preferred embodiment is directed to enhance a color output image and additionally includes a color selection unit 605 and a set of color control signal generation units 601 through 604. In the fourth preferred embodiment, an input data unit 200 provides a set of color component values or color input values for each pixel or each image data unit for processing. For example, the fourth preferred embodiment independently processes four color components including cyan, magenta, yellow and black. The color control signal generation units 601 through 604 respectively generates an independent set of control values for cyan, magenta, yellow and black. Although these control values include the same values "0," "15," and "−15," each of the color control signal generation units 601 through 604 generates a phase adjusted signals. In other words, a sequence of these values is shifted for each color component. The color selection unit 605 sequentially activates and receives the color control signal from each of the color control signal generation units 601 through 604, and the selected color control signal is inputted into an adder 102. Although it is not shown, in a first alternative embodiment according to the current invention, a single color control signal generation unit is used for sequentially generating the above described phase-adjusted color control signals for each color component. As described before with respect to other preferred embodiments, the adder 102 in turn performs the pattern promotion based upon the color control signals as well as the error diffusion based upon an output signal from the multiplier 405.

Figure 14:
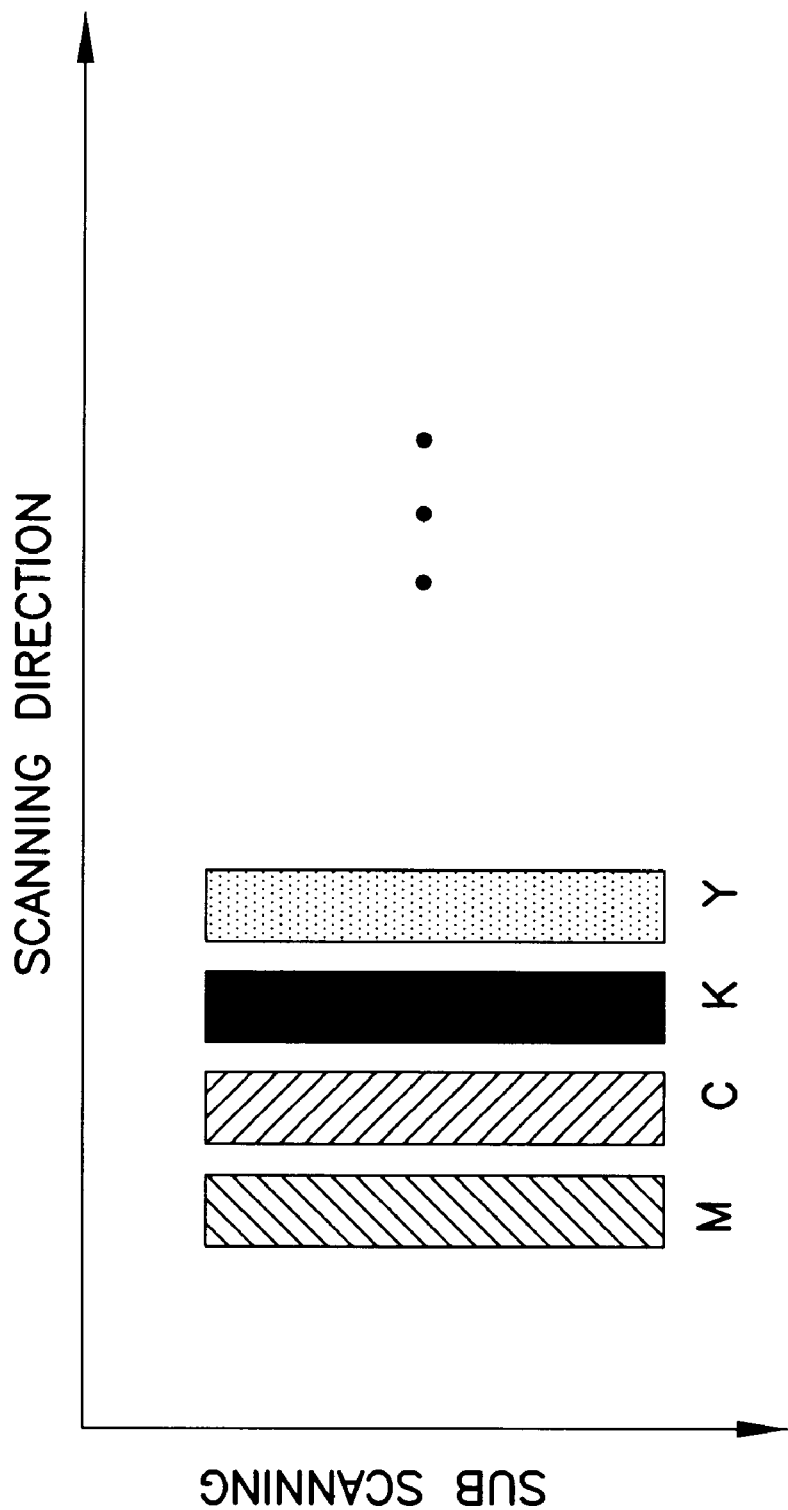
FIG. 14 is a block diagram illustrating a portion of a color output image containing a predetermined pattern of parallel lines generated by the fourth preferred embodiment.

Now referring to FIG. 14, based upon the above described phase-adjusted color control signals, the fourth preferred embodiment promotes a predetermined pattern of parallel lines in a sub-scanning direction. Since each of the color components forms its own parallel line, and they do not mix, a reproduction of highlight regions or low color intensity areas is improved.

Figure 15:
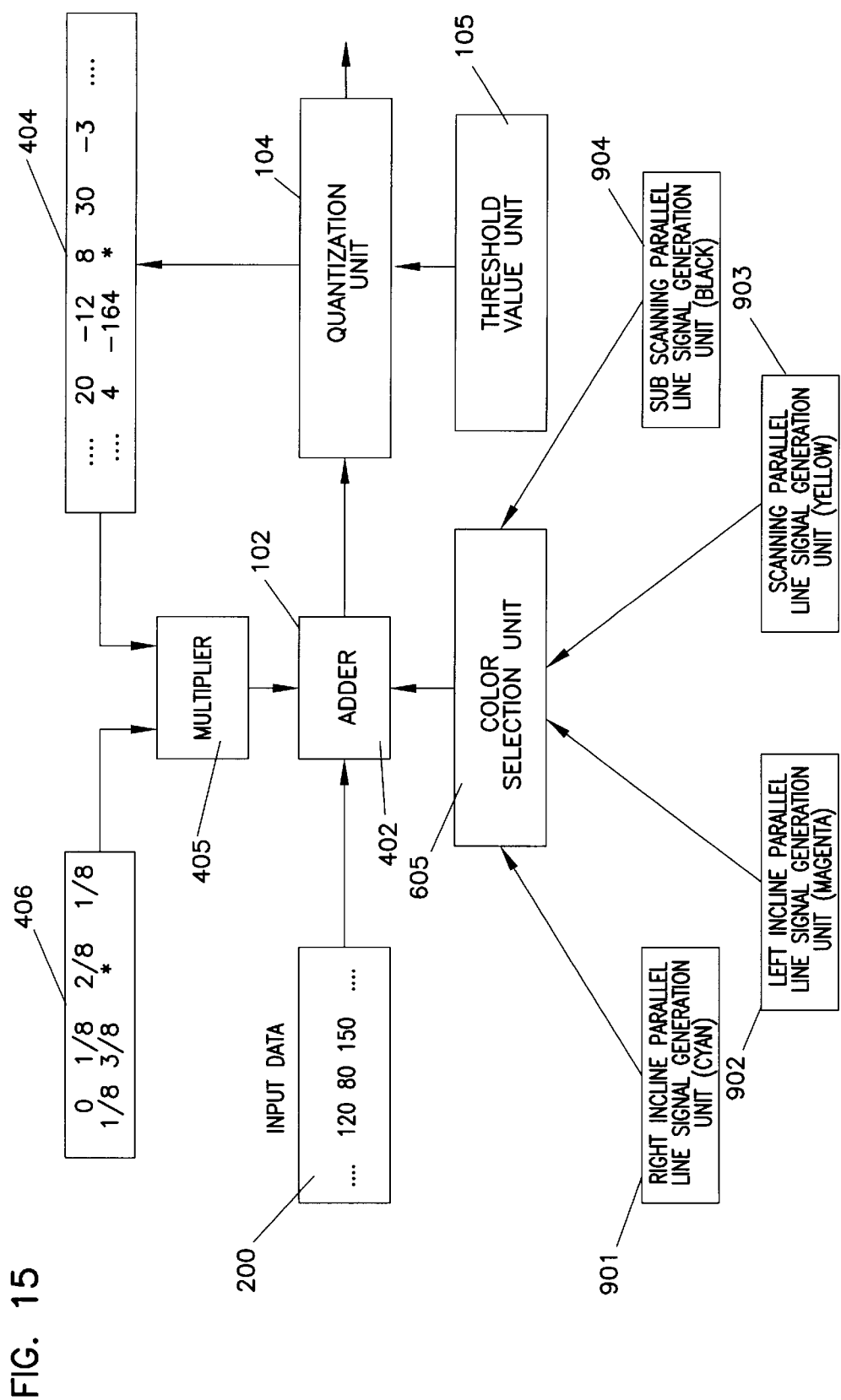
FIG. 15 is a block diagram illustrating a second alternative embodiment of the system for promoting predetermined patterns at a desirable orientation and error diffusing quantized errors in a color output image according to the current invention.

Referring to FIG. 15, a second alternative embodiment of the above described fourth preferred embodiment according to the current invention is illustrated. In general, the second alternative embodiment includes substantially similar components or units of the above described preferred embodiments, and these units are referred by the same referenced numerals. The second alternative embodiment capitalizes advantage of independent color control signal generation units 901 through 904.

Still referring to FIG. 15, these color control signal generation units 901 through 904 independently generates a color control signal which determines an orientation or an angle of each parallel line for a corresponding color component. The cyan color control signal generation unit 901 generates a cyan control signal which promotes a parallel line oriented at a right incline or at a first predetermined angle with respect to a sub-scanning direction. The magenta color control signal generation unit 902 generates a magenta control signal which promotes a parallel line oriented at a left incline or a second predetermined angle with respect to a sub-scanning direction. In contrast to cyan and magenta, the yellow color control signal generation unit 903 generates a yellow control signal which promotes a parallel line in a scanning direction. Lastly, the black color control signal generation unit 904 generates a black control signal which also promotes a parallel line in a sub-scanning direction.

Figure 16:
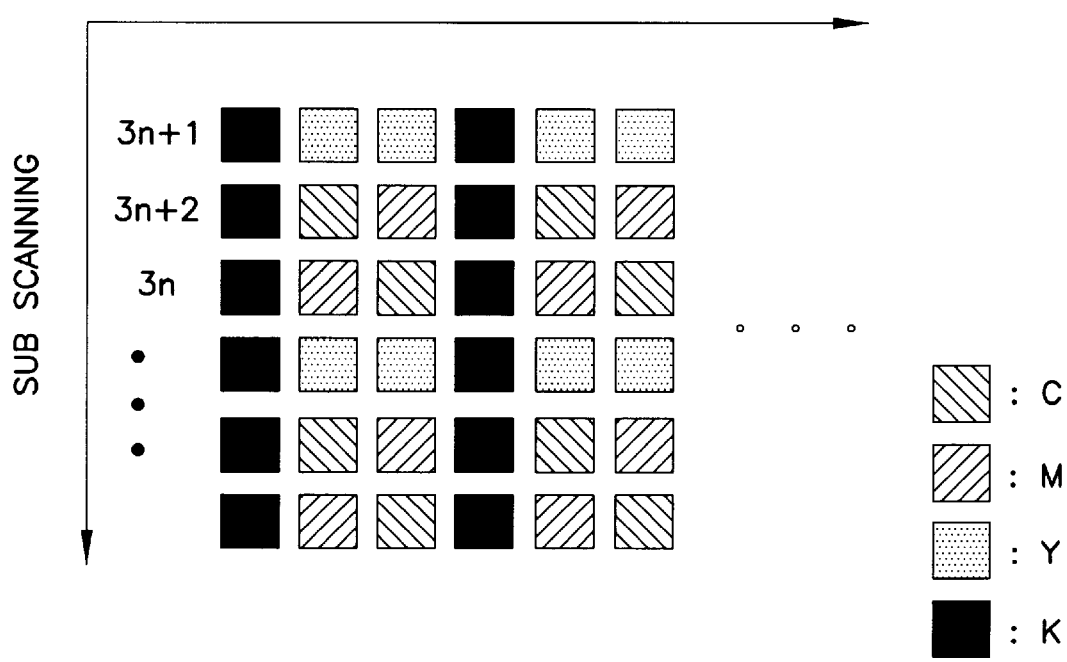
FIG. 16 is a block diagram illustrating a portion of a color output image containing a predetermined pattern of parallel lines generated by the second alternative embodiment.

Now referring to FIG. 16, a block diagram illustrates a portion of a gradational image which is generated by the above described second alternative embodiment according to the current invention. As described above, each parallel line has a predetermined unique orientation. The cyan color (C) as designated by boxed 45-degree hatched lines promotes a parallel line at a first predetermined angle. Similarly, the magenta color (M) as designated by also boxed 45-degree hatched lines promotes a parallel line at a second predetermined angle. The yellow (Y) and black (K) colors as designated by stippled and black boxes promote a parallel line that is respectively parallel to the scanning line and the sub-scanning line.

Figure 17:
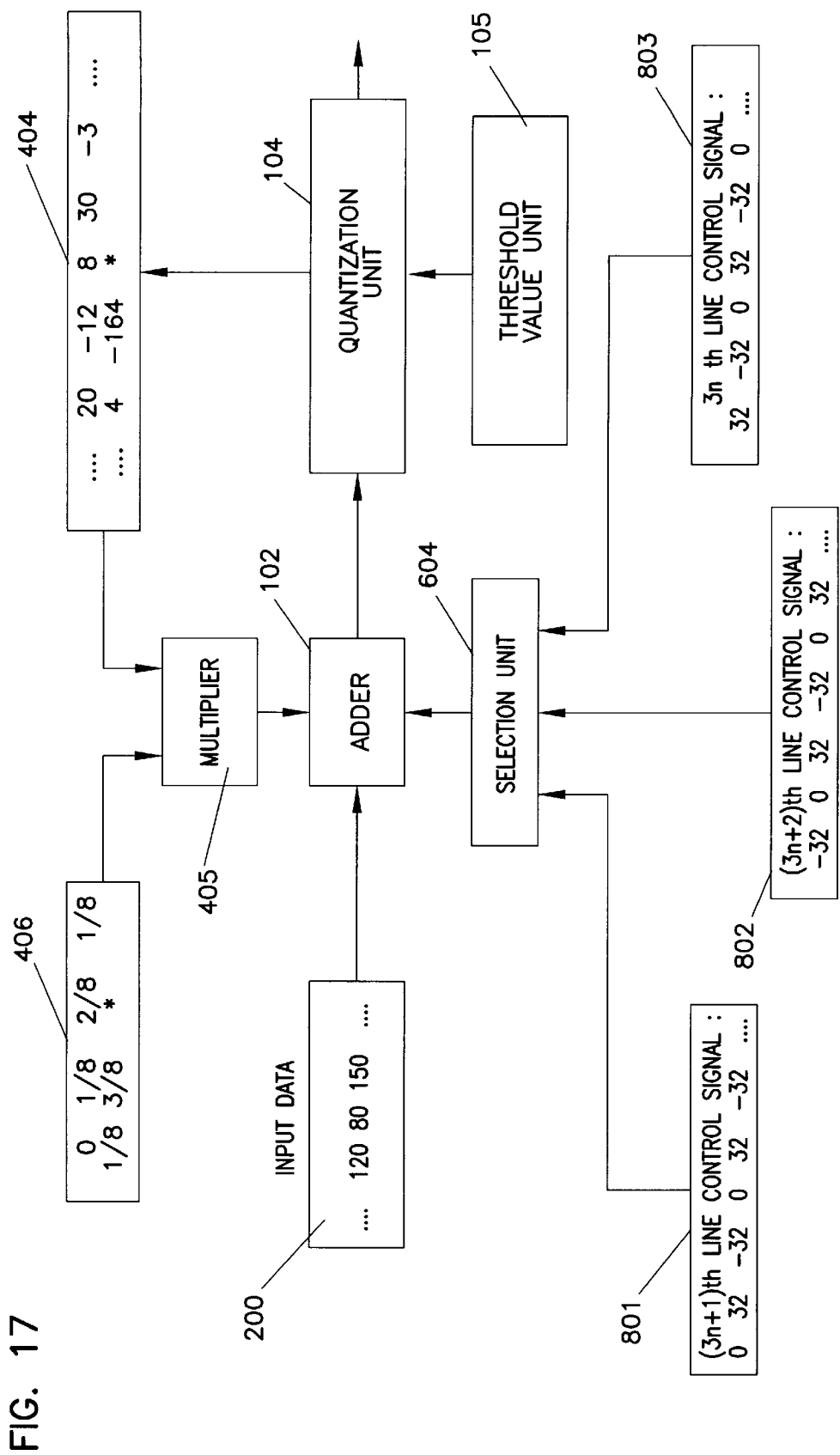
FIGS. 17 and 18 respectively illustrate a third alternative embodiment and its output image according to the current invention.

Now referring to FIG. 17, a third alternative embodiment of the system for promoting predetermined patterns at a desirable orientation in a multi-valued gradational output image according to the current invention is illustrated in a block diagram. In general, the third alternative embodiment illustrate how to generate a control signal that promotes a parallel-line pattern at a predetermined angle with respect to a scanning or sub-scanning direction. The third alternative embodiment includes substantially similar components or units of the above described preferred embodiments, and these units are referred by the same referenced numerals. The descriptions of these units are not reiterated herein but incorporated from the above. For the sake simplicity, input data is assumed to be gray-scale of a single color.

Still referring to FIG. 17, the third alternative embodiment includes three sets of control signals 801, 802 and 803 for three consecutive scanning lines. These sets of the control signals are independently generated by separate control signal generation units or are sequentially generated by a single control signal generation unit. These sets of the control signals contain the same values but in a slightly shifted order. A selection unit 604 sequentially applies each of these sets of the control signals to a corresponding portion of the input image data representing adjacent or consecutive three scanning lines in an output image. The three consecutive scanning lines are designated as 3n, (3n+1) and (3n+2) lines.

Figure 18:
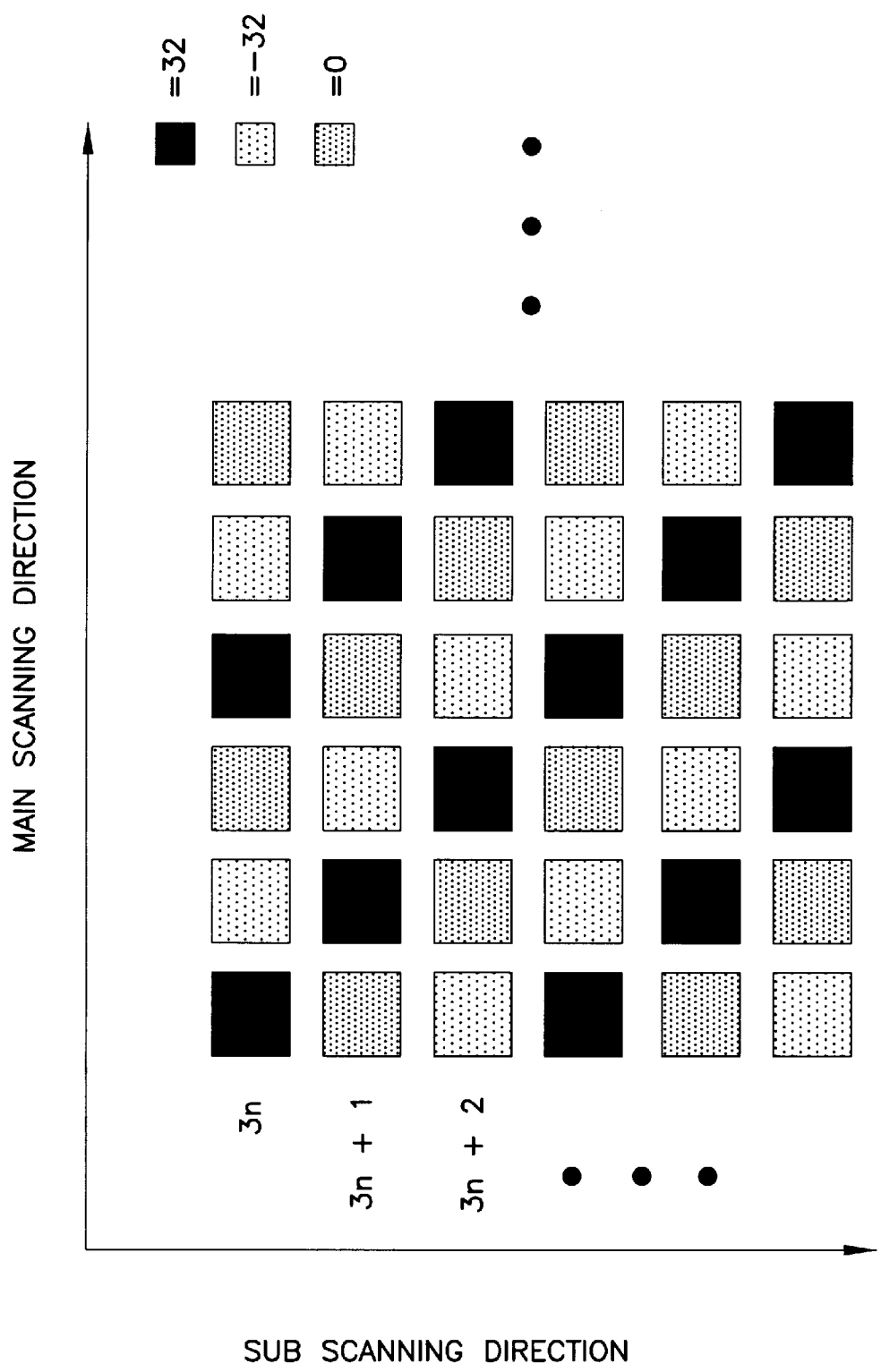

Now referring to FIG. 18, a block diagram illustrates a portion of a gradational image which is processed by the above described third alternative embodiment according to the current invention. As described above, each parallel line is orientated at a predetermined angle with respect to a scanning line. The predetermined angle is approximately 45 degrees with respect to either the scanning direction or the sub-scanning direction. As described below, the parallel lines on an image-carrying medium are least affected by jitter or undesirable mechanical movements when they are parallel to the sub-scanning direction. Although the current orientation may be more susceptible to the undesirable jitter, the angle also provides a better visual effect in certain output images.

Figure 19:
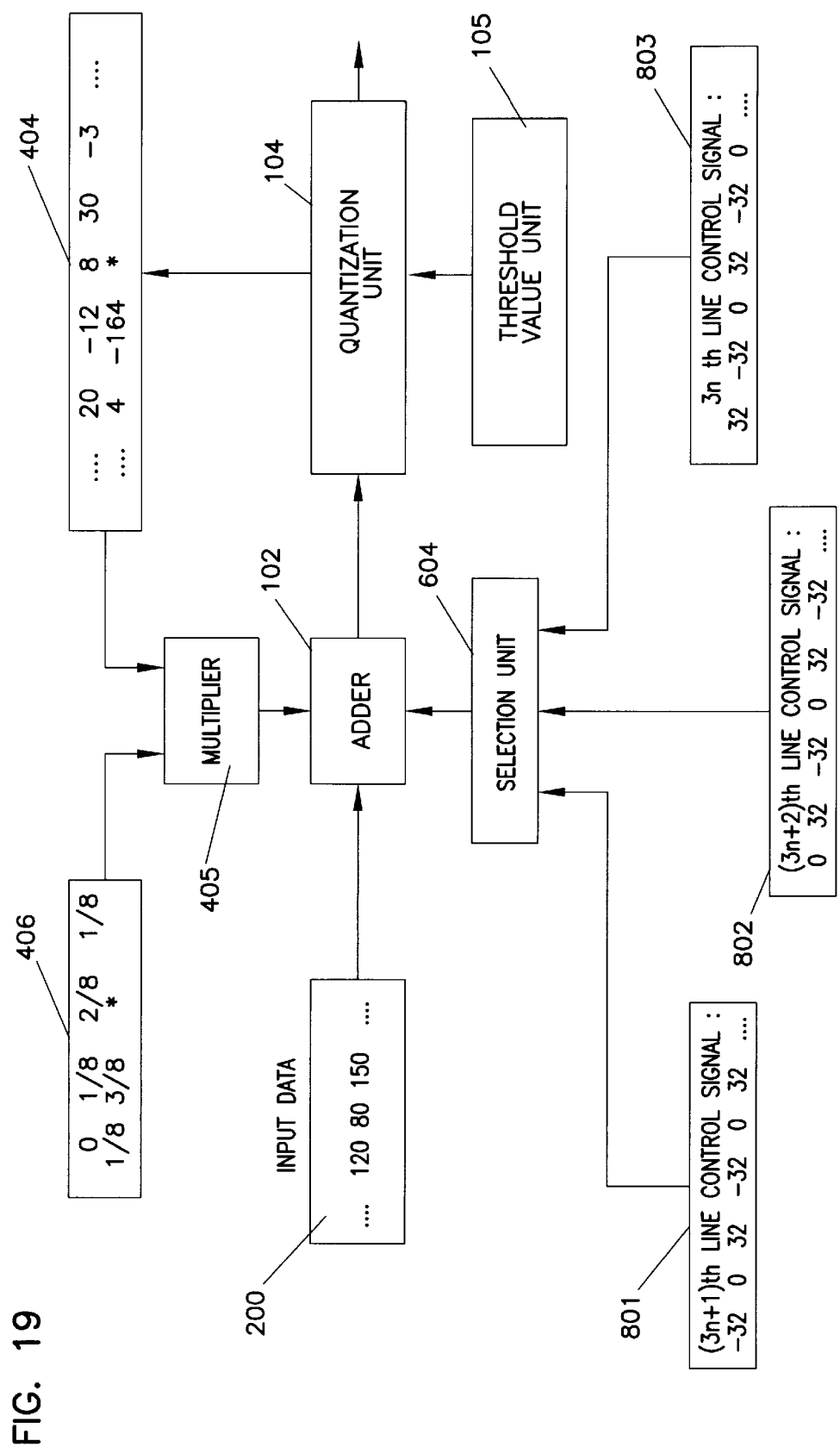
FIGS. 19 and 20 respectively illustrate a fourth alternative embodiment and its output image according to the current invention.
Figure 20:
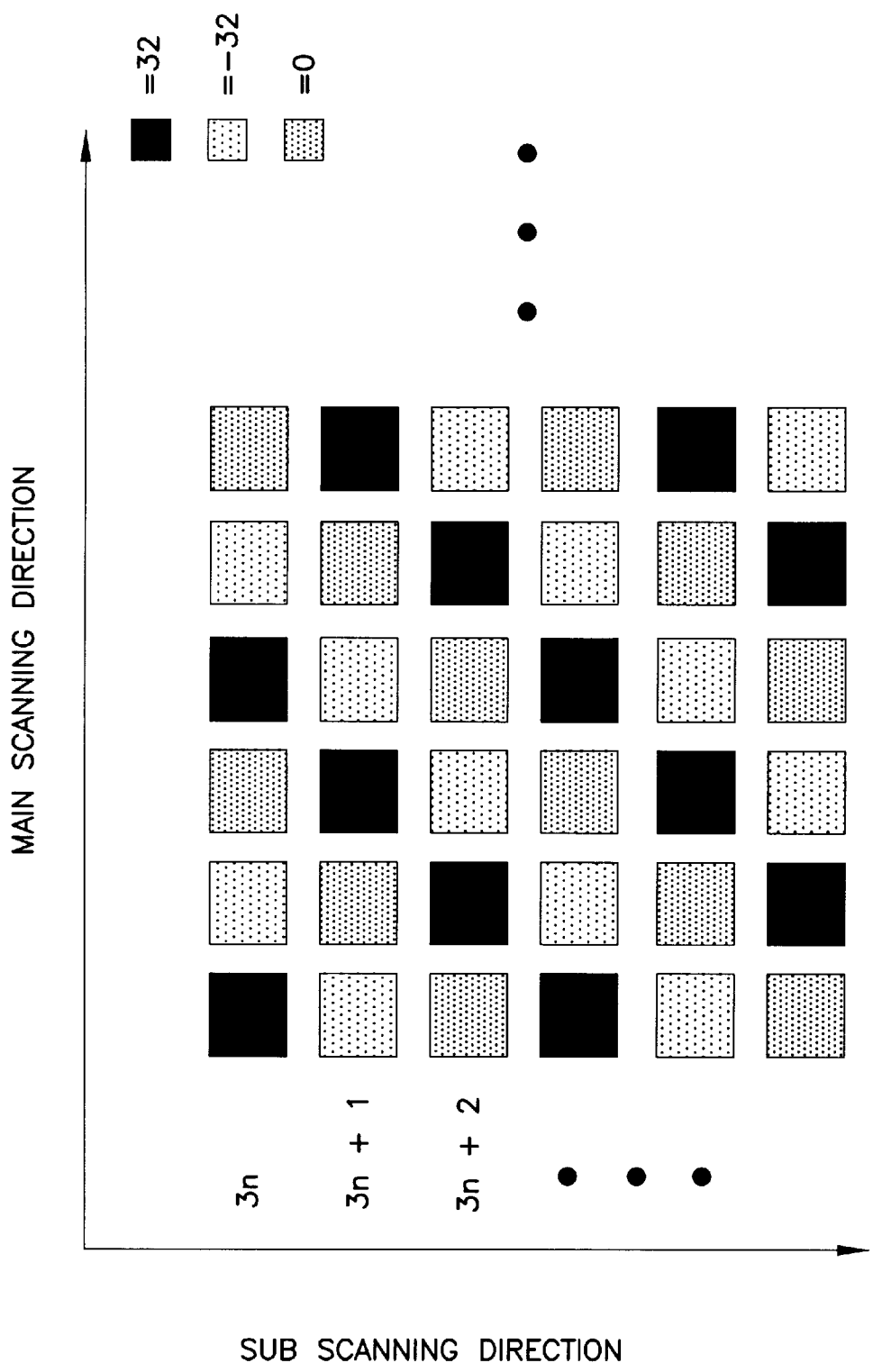

Now referring to FIGS. 19 and 20, the fourth alternative embodiment includes three sets of control signals 801, 802 and 803 for promoting parallel-line patterns in three consecutive scanning lines 3n, (3n+1) and (3n+2) at an orientation as shown in a block diagram illustrating a portion of a gradational image. In order to generate the parallel-line pattern at an approximately 45 degrees with respect to the sub-scanning direction but substantially perpendicular to the parallel lines shown in FIG. 18, the fourth alternative embodiment employs three sets of control signals 801, 802 and 803 which contain the same values but are shifted in a slightly different manner. The fourth alternative embodiment includes substantially similar components or units of the above described third alternative embodiment, and these units are referred by the same referenced numerals. The descriptions of these units are not reiterated herein but incorporated from the above.

Figure 21:
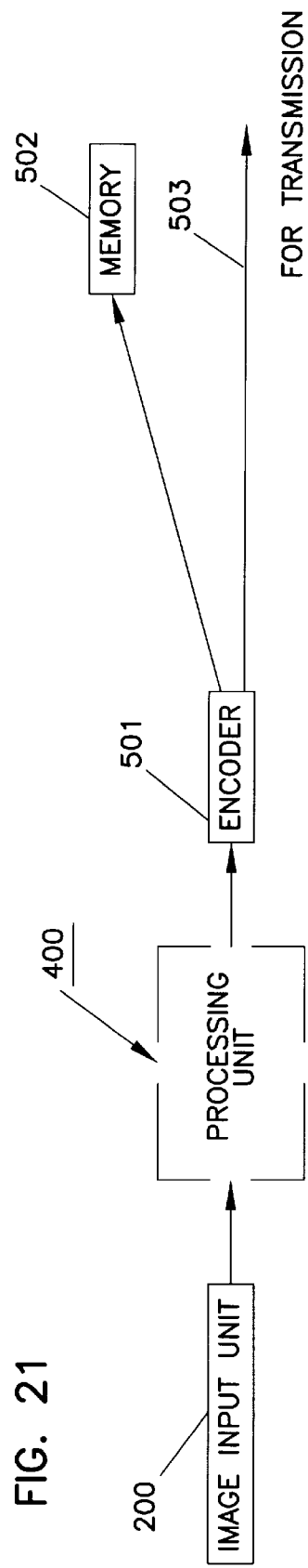
FIG. 21 is a block diagram illustrating a fifth preferred embodiment of the system for promoting predetermined patterns at a desirable orientation in a color output image and compressing the image output data according to the current invention.

Now referring to FIG. 21, a fifth preferred embodiment of the system for promoting predetermined patterns at a desirable orientation in a gradational output image according to the current invention is illustrated in a block diagram. In general, the fifth preferred embodiment includes substantially similar components or units of the above described preferred embodiments, and these units are referred by the same referenced numerals. The descriptions of these units are not reiterated herein but incorporated from the above. In particular, a processing unit 400 includes units performing an error diffusion process and or a control signal correction process. After the processing unit 400 processes image input data to generate quantized image data, a encoder or a compression unit compresses the image output data to reduce its size prior to storing in a memory 502 or transmitting the image output data via a transmission line 503.

Figure 22:
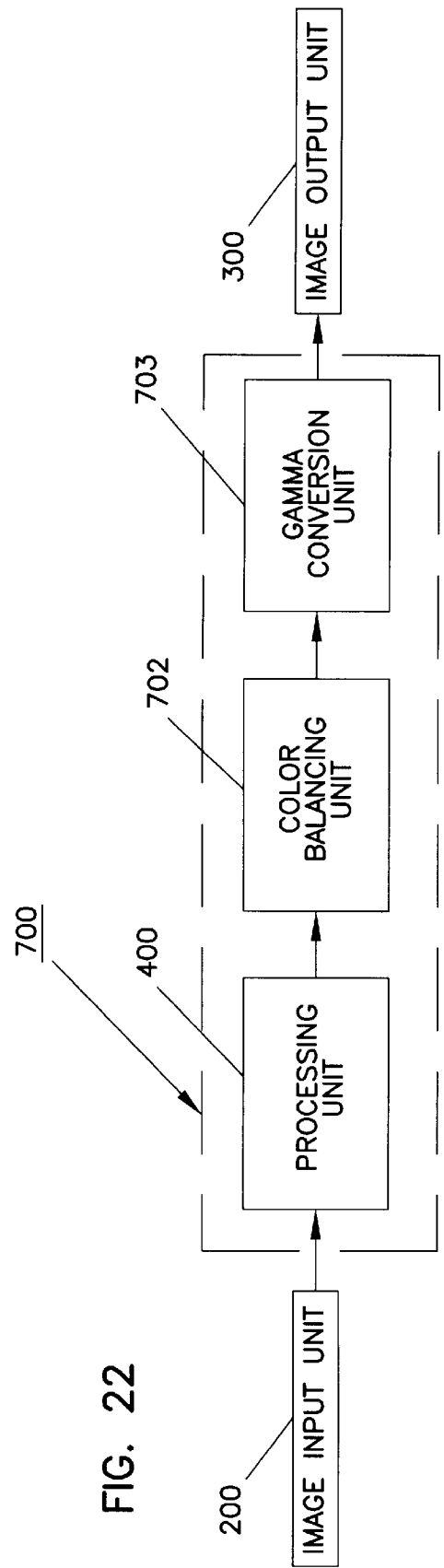
FIG. 22 is a block diagram illustrating a sixth preferred embodiment of the system for promoting predetermined patterns at a desirable orientation in a color output image and further color processing the image output data according to the current invention.

Now referring to FIG. 22, a sixth preferred embodiment of the system for promoting predetermined patterns at a desirable orientation in a gradational output image according to the current invention is illustrated in a block diagram. In general, the sixth preferred embodiment includes substantially similar components or units of the above described preferred embodiments, and these units are referred by the same referenced numerals. The descriptions of these units are not reiterated herein but incorporated from the above. In particular, a processing unit 400 includes units performing an error diffusion process and or a control signal correction process. A color processing unit 700 further includes a color balancing unit 702 and a gamma conversion unit 703. After the processing unit 400 performs a correction process and or an error diffusion process on image input data to generate quantized image data, a color balancing unit 702 performs a conventional color balancing process. In addition, the gamma conversion unit 703 performs a conventional gamma correction or conversion process on the color balanced data prior to outputting to an image output unit 300. It is preferred that the quantized image data includes multi values rather than binary values. Theses additional color processes further enhance the quality of an output image.

It is to be understood, however, that even though numerous characteristics and advantages of the present invention have been set forth in the foregoing description, together with details of the structure and function of the invention, the disclosure is illustrative only, and that although changes may be made in detail, especially in matters of shape, size and arrangement of parts, as well as implementation in software, hardware, or a combination of both, the changes are within the principles of the invention to the full extent indicated by the broad general meaning of the terms in which the appended claims are expressed.

What is claimed is:

1. A method of generating gradational image output data from image input data, comprising the steps of:
    a) generating a control signal for promoting a predetermined pattern and reducing texture in the gradational image output data, said control signal having a predetermined number of control values, a sum of said control values being zero;
    b) adding said control signal to the image input data for generating intermediate image data; and
    c) comparing said intermediate image data to at least one predetermined threshold value for generating the gradational image output data.

2. The method of generating gradational image output data according to claim 1 wherein said step c) involves a multiple of comparisons to multiple predetermined values for generating multiple gradation values.

3. The method of generating gradational image output data according to claim 1 wherein said control signal includes a predetermined number of control values, said control values periodically changing.

4. The method of generating gradational image output data according to claim 3 wherein said predetermined number of said control values is smaller than a number of input values in the image input data, said control signal being repeatedly added to the image input data in said step b).

5. The method of generating gradational image output data according to claim 1 wherein said control values include negative values.

6. The method of generating gradational image output data according to claim 1 wherein said predetermined pattern includes parallel lines.

7. The method of generating gradational image output data according to claim 6 wherein said parallel lines run in a sub-scanning direction.

8. The method of generating gradational image output data according to claim 1 wherein the image input data is color image data having a predetermined number of color components, said control signal being shifted by a predetermined amount of phase for each of said color components.

9. The method of generating gradational image output data from image input data according to claim 1 wherein the gradational image output data is encoded for compressing its data size.

10. A method of generating gradational image output data from image input data, comprising the steps of:
    a) generating a control signal for promoting a predetermined pattern and reducing texture in the gradational image output data, said control signal having a predetermined number of control values, a sum of said control values being zero;
    b) modifying a first portion of the image input data based upon said control signal for generating first intermediate image data;
    c) quantizing said first intermediate image data based upon at least one predetermined threshold value for generating first quantized image output data;
    d) modifying a second portion of the image input data based upon said control signal for generating second intermediate image data;
    e) error diffusing a difference between said first intermediate image data and said first quantized image data in said second intermediate image data which has been modified in said step d); and
    f) quantizing said second intermediate image data based upon at least said one predetermined threshold value for generating the gradational image output data.

11. The method of generating gradational image output data from image input data according to claim 10 wherein the gradational image output data has a data size, the gradational image output being encoded for compressing said data size.

12. The method of generating gradational image output data according to claim 10 wherein said steps c) and f) involve a multiple of comparisons to multiple predetermined threshold values for generating multiple gradation values.

13. The method of generating gradational image output data according to claim 10 wherein said control signal includes a predetermined number of control values, said control values periodically changing.

14. The method of generating gradational image output data according to claim 13 wherein said predetermined number of said control values being smaller than a number of input values in the image input data, said control signal being repeatedly added to the image input data in said steps b) and d).

15. The method of generating gradational image output data according to claim 10 wherein said control values include negative values.

16. The method of generating gradational image output data according to claim 10 wherein said predetermined pattern includes parallel lines.

17. The method of generating gradational image output data according to claim 16 wherein said parallel lines run in a sub-scanning direction.

18. The method of generating gradational image output data according to claim 10 wherein the image input data is color image data having a predetermined number of color components, said control signal being shifted according to a predetermined amount of phase for each of said color components.

19. The method of generating gradational image output data according to claim 18 wherein the gradational image output data is further color balanced.

20. The method of generating gradational image output data according to claim 18 wherein the gradational image output data is further processed according to a predetermined gamma correction.

21. The method of generating gradational image output data according to claim 18 wherein said parallel lines are orientated at a predetermined angle with respect to a sub-scanning direction.

22. The method of generating gradational image output data according to claim 21 wherein an image is formed on an image-carrying medium according to said gradational image output data, said image-carrying medium being moved in said sub-scanning direction while said image is formed in a scanning direction.

23. The method of generating gradational image output data according to claim 21 wherein each of said parallel lines corresponds to one of said color components and is orientated at a predetermined angle with respect to said sub-scanning direction.

24. A system of generating gradational image output data from image input data, comprising:
- a control signal generation unit for generating a control signal which promotes a predetermined pattern and reduces texture in the gradational image output data, said control signal having a predetermined number of control values, a sum of said control values being zero;
- an adder connected to said control signal generation unit for adding said control signal to the image input data so as to generate intermediate image data; and
- a comparator connected to said adder for comparing said intermediate image data to at least one predetermined threshold value so as to generate the gradational image output data.

25. The system for generating gradational image output data according to claim 24 wherein said comparator includes a table storing multiple predetermined values so as to generate multiple intensity levels in the gradational image output data.

26. The system for generating gradational image output data according to claim 24 wherein said control signal generation unit generates said control signal having a predetermined number of control values, said control values periodically changing.

27. The system for generating gradational image output data according to claim 26 wherein said predetermined number of said control values being smaller than a number of input values in the image input data, said adder repeatedly adding said control signal to the image input data.

28. The system for generating gradational image output data according to claim 24 wherein said control values include negative values.

29. The system for generating gradational image output data according to claim 24 wherein said predetermined pattern includes parallel lines.

30. The system for generating gradational image output data according to claim 29 wherein said parallel lines run in a sub-scanning direction.

31. The system for generating gradational image output data according to claim 24 wherein the image input data is color image data having a predetermined number of color components, said control signal generation unit shifting said control signal by a predetermined amount of phase for each of said color components.

32. A system of generating gradational image output data from image input data, comprising:
- a control signal generation unit for generating a control signal which promotes a predetermined pattern and reduces texture in the gradational image output data, said control signal having a predetermined number of control values, a sum of said control values being zero;
- an error diffusion unit for determining an amount of error to be diffused and for generating an error signal based upon said error;
- an adder connected to said control signal generation unit and said error diffusion unit for adding said control signal and said error signal to the image input data so as to generate intermediate image data; and
- a comparator connected to said adder for comparing said intermediate image data to at least one predetermined threshold value so as to generate the gradational image output data.

33. The system of generating gradational image output data according to claim 32 wherein said error diffusion unit further comprising:
- an error memory unit connected to said comparator for storing a predetermined number of error values, each of said error values being said error between a portion of the gradational image output data and a corresponding portion of said intermediate image data;
- a weight storage unit for storing a predetermined set of weight values each of which corresponds to said error values; and
- a multiplier connected to said error memory unit and said weight storage unit for determining a sum of a product of a corresponding pair of one of said weight values and one of said error values.

34. The system for generating gradational image output data according to claim 32 wherein said control signal generation unit generates said control signal having a predetermined number of control values, said control values periodically changing.

35. The system for generating gradational image output data according to claim 34 wherein said predetermined number of said control values being smaller than a number of input values in the image input data, said adder repeatedly adding said control signal to the image input data.

36. The system for generating gradational image output data according to claim 32 wherein said control values are negative.

37. The system for generating gradational image output data according to claim 32 wherein said predetermined pattern includes parallel lines.

38. The system for generating gradational image output data according to claim 37 wherein said parallel lines run in a sub-scanning direction.

39. The system for generating gradational image output data according to claim 32 wherein the image input data is color image data having a predetermined number of color components, said control signal generation unit generating a plurality of color control signals for corresponding ones of said color components.

40. The system for generating gradational image output data according to claim 39 further comprising:
- a color selection unit connected to said control signal generation unit for receiving said color control signals and also connected to said adder for selecting one of said color control signals.

41. The system for generating gradational image output data according to claim 40 wherein each of said color control signals is shifted according to a predetermined amount of phase.

42. The system for generating gradational image output data according to claim 40 wherein each of said color control signals promotes in the gradational image output data said parallel line at a predetermined angle with respect to said sub-scanning direction for a corresponding one of said color components.

43. The system for generating gradational image output data according to claim 39 further comprising a color balance unit for further processing the gradational image output data to be color balanced.

44. The method of generating gradational image output data according to claim 39 further comprising a gamma correction unit for further processing the gradational image output data according to a predetermined gamma correction curve.

* * * * *